United States Patent [19]

Tanaka et al.

[11] Patent Number: 4,733,156
[45] Date of Patent: Mar. 22, 1988

[54] POWER SYSTEM STABILIZING APPARATUS

[75] Inventors: Seiichi Tanaka; Masaru Shimomura, both of Kobe, Japan

[73] Assignee: Mitsubishi Denki Kabushiki Kaisha, Tokyo, Japan

[21] Appl. No.: 870,011

[22] Filed: Jun. 3, 1986

[30] Foreign Application Priority Data

Jun. 5, 1985 [JP] Japan .................. 60-121917

[51] Int. Cl.$^4$ .................. H02P 9/10; H02P 9/14
[52] U.S. Cl. .................. 322/20; 322/22; 322/58
[58] Field of Search .......... 322/19, 20, 24, 58, 322/17, 18, 22; 361/20

[56] References Cited

U.S. PATENT DOCUMENTS

| 4,329,637 | 5/1982 | Kotake et al. | 322/58 X |
| 4,393,345 | 7/1983 | Fork | 322/58 X |
| 4,412,171 | 10/1983 | Kaufhold | 322/58 X |

FOREIGN PATENT DOCUMENTS 53-44204 11/1978 Japan.
0074400 6/1980 Japan .................. 322/19

Primary Examiner—R. J. Hickey
Attorney, Agent, or Firm—Burns, Doane, Swecker & Mathis

[57] ABSTRACT

This invention relates to a power system stabilizing apparatus for a synchronous generator, which comprises two power system stabilizers for raising the stability of an electric power system. The characteristics of one stabilizer is preset so as to increase the braking power in the same way as in a conventional power system stabilizing apparatus, while the other one being preset so as to increase the synchronizing power, so that phase compensation elements of both power system stabilizers can be varied in accordance with the drift amount of the generator such as the revolution deviation of the rotor thereof, the output deviation thereof, the frequency deviation of the terminal voltage thereof, etc. thereby realizing high static and transient stability.

5 Claims, 6 Drawing Figures

POWER SYSTEM STABILIZING APPARATUS

BACKGROUND OF THE INVENTION

1. Field of the Invention

This invention relates to a power system stabilizing apparatus with a power system stabilizer (PSS) for a synchronous generator.

2. Description of the Prior Art

Automatic voltage regulators (AVR) have been widely applied with the output thereof being transmitted to the exciter for controlling the field current in order to maintain the terminal voltage of the synchronous generator at a constant predetermined level. However, if the response of the AVR is too quick, a negative control effect may take place in the synchronous generator, resulting in a disorder of the overall system stabilization. Therefore, the power system stabilizing apparatus with PSS is applied to prevent such a disorder effect.

FIG. 1 shows a block diagram of the power system stabilizing apparatus for a synchronous generator, which is disclosed in Japanese Patent Publication No. 53-44204 (1978).

Referring to FIg. 1, 1 designates an input terminal giving a deviation from the reference terminal voltage of a generator, 2 designates PSS, 3 designates the input terminal of the PSS 2, 4 designates a damping circuit, 5 designates an adder circuit subtracting the output of the damping circuit 4 from the sum of the deviation from the input terminal 1 and the output of the PSS 2, 6 designates an AVR controlling an exciter 7 by the output of the above adder circuit 4 and 7 designates an exciter, which is controlled by the above AVR 6, so as to supply the field current to the generator (not shown), while 2a designates a filter circuit which is used to define the domain range of the PSS 2 corresponding to input signals 3 of the PSS 2 and featured with the transfer function;

$$\frac{T_R s}{1 + T_R s} \cdot \frac{1}{1 + T_H s}$$

where $T_R$ and $T_H$ are the time constants of the set filter constructing the above filter circuit 2a and of the high pass filter respectively.

On the other hand, 2b is a phase compensation circuit for time delays of the AVR 6, the exciter 7, the generator, etc. and is an advance/delay circuit with an amplification effect, which is normally represented in the form;

$$K \frac{1 + T_{12} s}{1 + T_{11} s}$$

where K·is a gain of the PSS 2 while $T_{11}$ and $T_{12}$ are a delay time constant and an advance time constant respectively.

Furthermore, 2c designates a limiter which limits the output signals of the PSS 2 to a signal level appropriate for the entire exciting system shown in FIG. 4. Usually, revolution deviation of the generator rotor, frequency deviation of the generator terminal voltage, output deviation of the generator itself, etc. are used as the input signals of the PSS 2.

Now the power system stabilizing apparatus actions will be described. When the terminal voltage of the generator deviates from its reference value, the input terminal receives the corresponding deviation signal, which is amplified by the AVR 6 and input to the exciter 7, where the deviation signal is further amplified, supplied to the field windings of the generator and so controlled such that the deviation of the generator terminal voltage from its reference value returns to zero. The damping circuit 4 is used to stabilize the above control action and to feedback the output therefrom to the adder circuit 5, as mentioned before. The output of the PSS 2 is added supplementarily to such a control in order to improve the stabilization of the power system.

Supposing that the input signal to the PSS 2 is a revolution deviation, the filter circuit 2a cuts off the direct current and high frequency portion of this input signal, which is then input to the amplification and phase compensation circuit 2b for amplification and phase compensation. The amplification and phase compensation circuit 2b is controlled to less than its appropriate level through the limiter 2c and then fed to the adder circuit 5. Therefore, the output of the exciter 7 is controlled in such a manner that drift motion of the generator can be prevented.

Now, the function of the PSS 2 will be described. FIG. 2 shows a block diagram with linear approximation of drift motion of a generator representing a one-machine infinite system as described, for instance, in Bulletin of Electric Cooperative Researches, Vol. 34, No. 5. In FIG. 2, $K_1$ means a synchronizing torque factor to be generated by a generator with constant field crossing fluxes, $K_1'$ means the synchronizing torque factor to be generated by the AVR and $K_1''$ means the synchronizing torque factor to be generated by the PSS 2, while D means a braking torque factor to be generated by the generator with constant field crossing fluxes, D' means a braking torque factor to be generated by the AVR 6 and D'' means a braking torque factor to be generated by the PSS 2.

Moreover, $\Delta T_M$ indicates the mechanical input torque deviation,

M indicates the inertial constant of the generator, $\Delta \omega$ indicates the revolution deviation, $\omega_0$ indicates the reference revolution and $\Delta \theta$ indicates the phase difference angle deviation.

$\Delta T_M$, $\Delta \omega$ and $\Delta \theta$ can be expressed in the differential equation given below. The equation is in the same form of, the so-called, equation of motion of secondary system.

$$\frac{M}{\omega_0} \cdot \frac{d^2 \Delta \theta}{dt^2} + \frac{D^*}{\omega_0} \cdot \frac{d\Delta \theta}{dt} + K^* \Delta \theta = T_M,$$

wherein $D^* = D + D' + D''$ $K^* = K + K' + K''$

This equation of motion is Laplacetransformed into the transfer function, which is represented in FIG. 2. Since $\Delta T_M$ is a torque, that is, an angle acceleration power, $\Delta \omega$ is a number of revolution, that is, an angle velocity, $\Delta \theta$ is an angle, it may be well concluded that the relationship among them is; the angle velocity is gained by integrating the angle acceleration force, and the angle is gained by integrating angle velocity. Accordingly, it can be said that both the blocks of (1/MS)

and ($\omega_0/s$) in FIG. 2 represent integrators whose time constants are M and ($1/\omega_0$) respectively.

Generally speaking, D' tends to take a negative value in cases where the phase angle $\theta$ increases at a power factor being near 1.0. Particularly when the AVR 6 with quick response and high gain is used, the value of D+D' becomes negative sometimes, resulting in failure of static stability due to insufficient braking power. In such cases, the PSS 2 is added to generate the braking power D" for the stabilization required.

The above stabilizing effect is illustrated in FIG. 3, where the synchronizing torque and the braking torque are taken as the abscissa and the ordinate respectively. Both the synchronizing torque and the braking torque of a synchronous generator with constant field crossing fluxes are positive, and the sum of the torques (shown as $K_1+D$) is found in the first quadrant, while the braking torque to be generated by the AVR 6 being negative, the sum of the braking torque and the synchronizing torque (shown as $K_1'+D'$) is found in the forth quadrant. The sum of the torques generated by the AVR 6 and the generator with constant field crossing fluxes (shown as $K_1+K_1'+D+D'$) takes a value of approximately equal to zero or sometimes a negative value, resulting in failure of the static stabilization. When the PSS 2 gives a braking torque (whose sum with the synchronizing torque $K_1''$ is shown as $K_1''+D''$) which cancels the braking torque of the AVR 6, the total sum of torques becomes $K_1+K_1'+K_1''+D+D'+D''$. Thus a conditon approximately identical with that in the absence of the AVR 6 is recovered for the stabilization control.

Nevertheless, it is impossible for the conventional PSS to realize the increased synchronizing power, which is needed to recover to static stabilization in a transient domain where the generator drifts excessively immediately after an accident has taken place in the power system. This is because the conventional PSS have not originally been so constructed so as to increase the synchronizing power and generally their synchronizing torque factor $K_1''$ is very small or negative as shown in FIG. 3.

It can be concluded that a conventional power system stabilizing apparatus for a synchronous generator has problems in low transient stability.

SUMMARY OF THE INVENTION

This invention has as an object to solve the problems described above and to provide a power system stabilizing apparatus for a synchronous generator, which is provided with two PSSs, the characteristics of one PSS being preset so as to increase the braking power while the characteristics of the other PSS being preset to increase the synchronizing power. Their phase compensation elements (time constants) can be varied in accordance with the drift amount, so that the synchronizing power in the transient domain is increased sufficiently for improving the transient stability while the braking power in the static domain is increased sufficiently for increasing the static stability.

The above and further objects and features of the invention will more fully be apparent from the following detailed description with accompanying drawings.

DETAILED DESCRIPTION OF THE PREFERRED EMBODIMENTS

Figure 4:
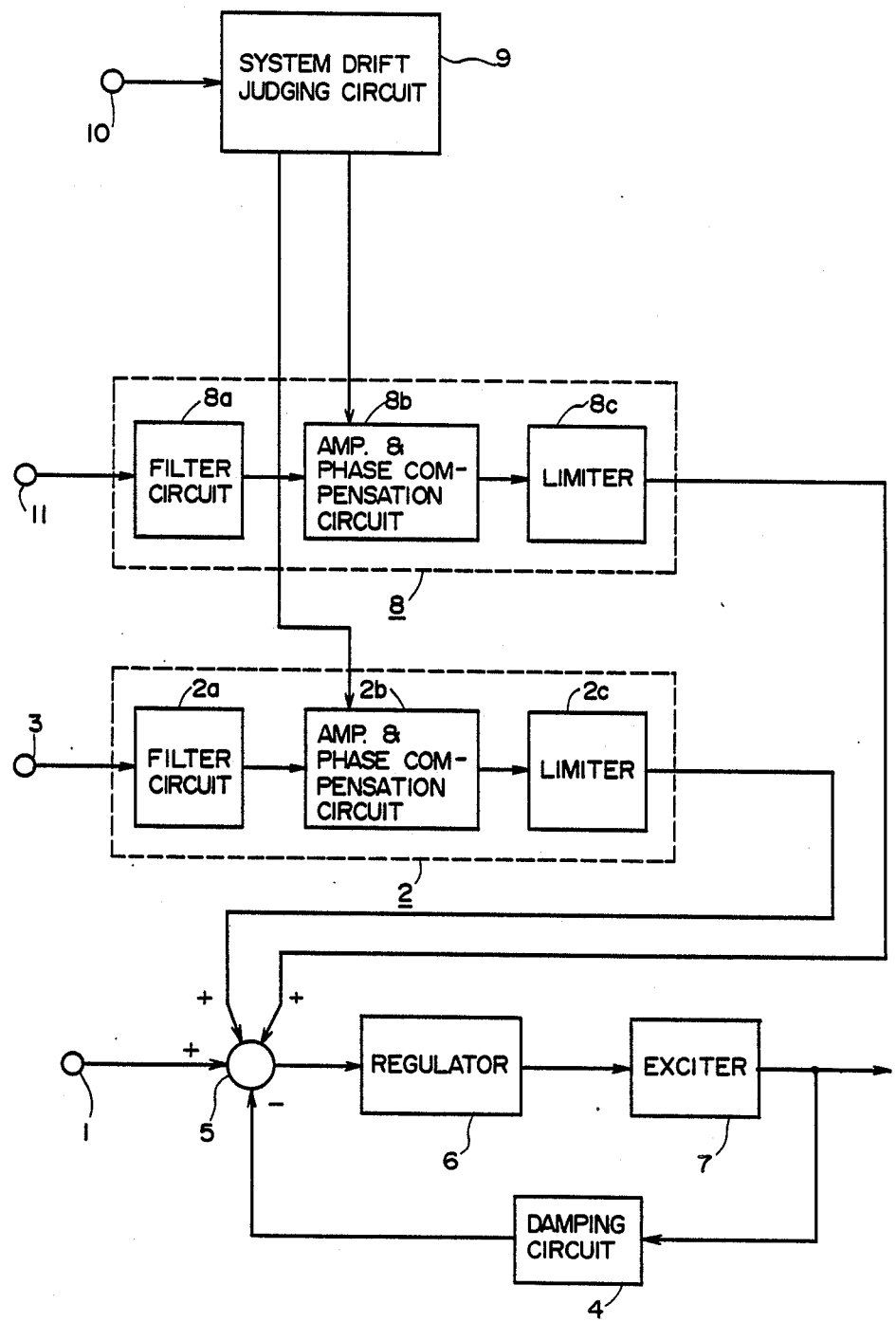
FIG. 4 shows a block diagram of a power system stabilizing apparatus for a synchronous generator of the present invention.

FIG. 4 shows a block diagram of the apparatus of the present invention, wherein deviation of the terminal voltage of a synchronous generator (not shown) from its reference value is supplied to the input terminal 1 and added in the adder circuit 5 to the outputs of the PSSs 2 and 8 and substracting therefrom the output of the damping circuit 4. The output of the adder circuit 5 is given to the AVR 6, while an output required for making the terminal voltage of the synchronous generator return to its reference value is given to an exciter 7, which supplies the corresponding exciting current to field windings of the synchronous generator.

Figure 1:
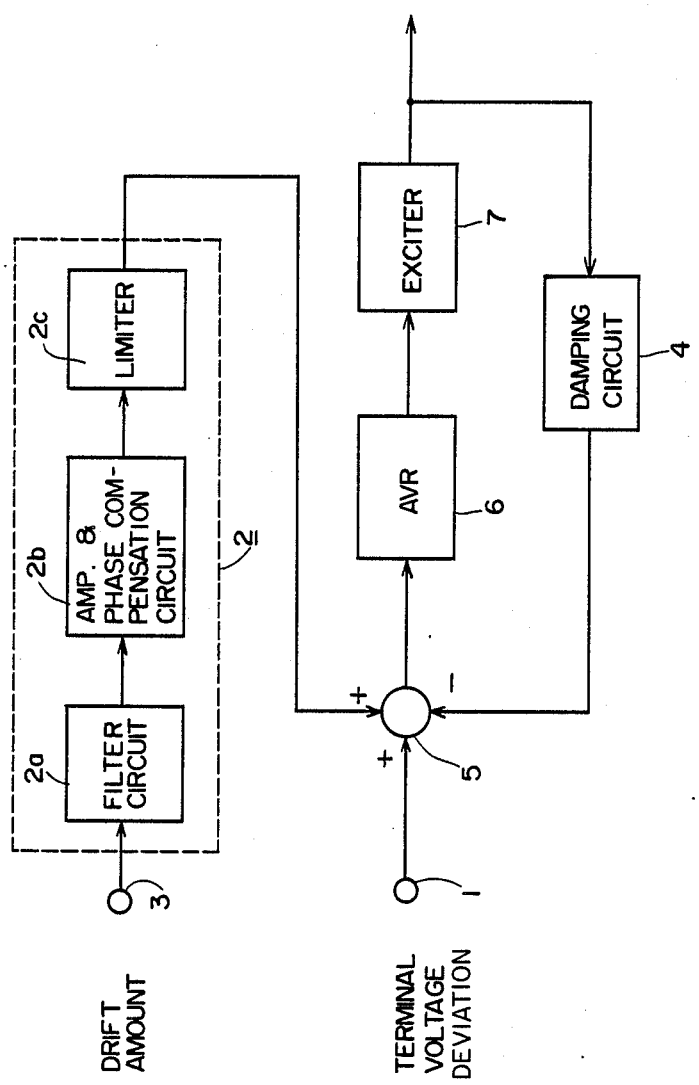
FIG. 1 shows a block diagram for a conventional power system stabilizing apparatus for a synchronous generator.
Figure 3:
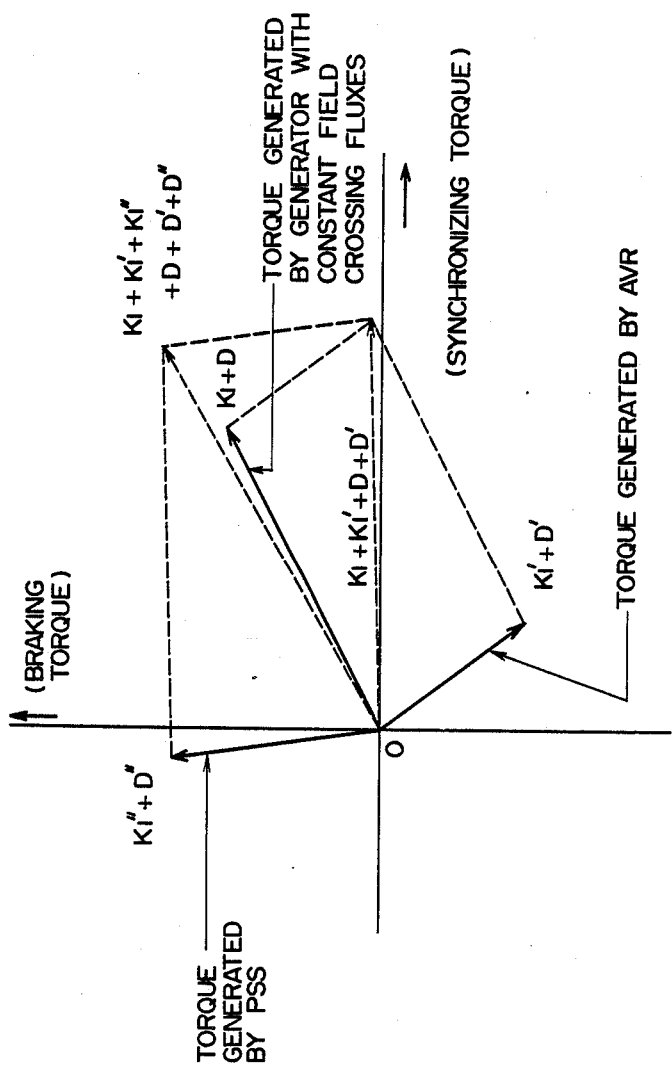
FIG. 3 shows a vector diagram explaining the torque characteristics of a conventional power system stabilizing apparatus.

Both PSSs 2 and 8 are provided with filter circuits 2a and 8a, amplification and phase compensation circuits 2b and 8b and limiter circuits 2c and 8c respectively. The drift amount of the synchronous generator is given to input terminals 3 and 11 and outputs of the limiter 2c and 8c are input to the adder circuit 5, as described before. Similar to the conventional apparatus shown in FIG. 1, the PSS 2 is preset to have characteristics as shown in FIG. 3, that is, effectiveness for increasing the braking power.

On the other hand, the PSS 8 has a preset characteristic for increasing the synchronizing power, namely, there being no difference of construction between the filter circuits 2a, 8a and the limiter circuits 2c, 8c, while the amplification and phase compensation circuit 8b having the transfer function;

$$C_2 \frac{1 + T_{22}s}{1 + T_{21}s}$$

where
C$_2$ is a constant,
T$_{21}$ and T$_{22}$ are a dely time constant and an advance time constant respectively, which is different from that of another amplification and phase compensation circuit 2b. The phase compensation elements (time constants) of these amplification and phase compensation circuits 2b and 8b can be varied and adjusted according to output of the drift amount judging circuit 9, as described later.

Figure 2:
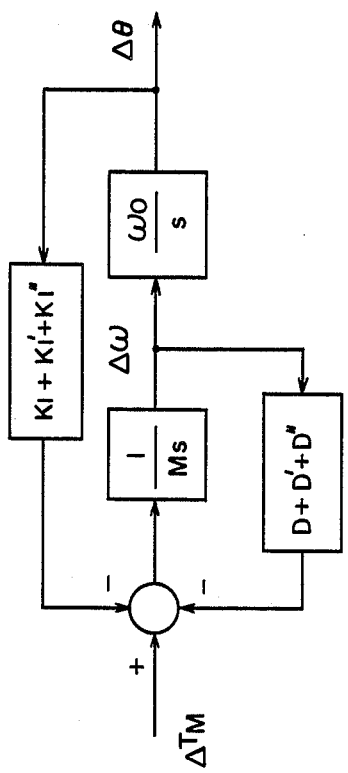
FIG. 2 shows a block diagram with linear approximation of drift motion of a synchronous generator representing one machine infinite system.
Figure 5:
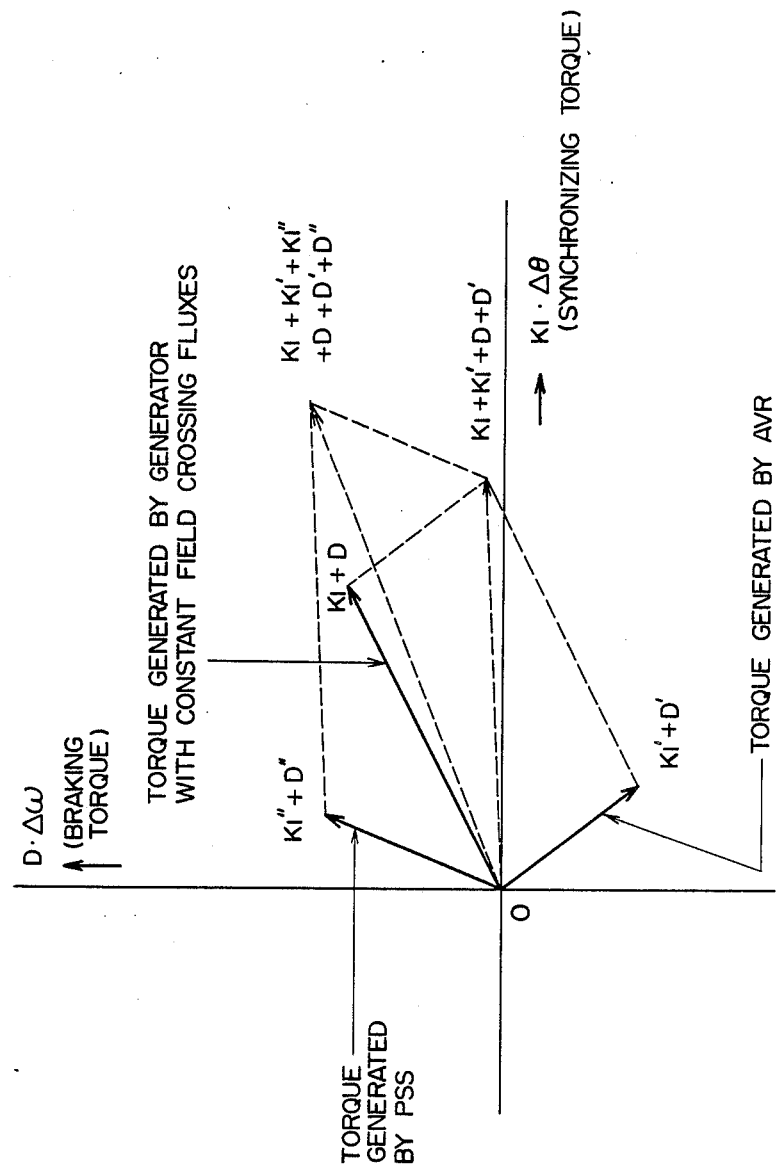
FIG. 5 shows a vector diagram explaining the torque characteristics in a case of being connected to a PSS of increased synchronizing power.

Now, FIG. 5 will be described. With $K_1$, $K_1'$, $K_1''$ and D, D', D" being defined in the same way as in FIGS. 2 and 3, the sum of the torque generated by the AVR 6 and the torque generated by the generator with constant field crossing fluxes (shown as $K_1+K_1'+D+D'$) sometimes takes a value nearly equal to zero, in the same way as shown in FIG. 3. On the other hand, the PSS 2 gives a sum of a braking torque for cancelling the braking torque generated by the AVR 6 and a synchronizing torque for increasing further the existing synchronizing power (shown as $K_1''+D''$), resulting in the total sum of synchronizing torques $(K_1+K_1'+K_1''+D+D'+D'')$ greater than $K_1+K_1'+D+D'$.

Moreover, the input terminal 11 of the first PSS 8 receives the revolution deviation of the generator or the frequency deviation of the terminal voltage as drift amount of the synchronous generator, while the input terminal 3 of the second PSS 2 receives the output deviation of the synchronous generator.

The reason why is explained as follows; the phase of the input signal of the first PSS 8 side deviates from that of the second PSS 2 side by 90 degrees.

The drift amount judging circuit 9 judges whether the drift amount of the synchronous generator, i.e. the revolution deviation of the generator, the frequency deviation of the terminal voltage or the output deviation of the generator exceeds a predetermined threshold value or not by using them as the input signals. In a domain where the threshold value is exceeded, i.e., the transient domain, the phase compensation elements (time constants) of amplification and phase compensation circuits 2b, 8b are so varied respectively causing the phase compensation of the first PSS 8 to advance and the phase compensation of the second PSS 2 to delay. Conversely, in a domain where the input signal is lower than the threshold value, i.e., the static domain, the phase compensation of the first PSS 8 is delayed while the phase of the second PSS 2 is advanced. The $K_1''$ value of the first PSS 8 increases according to the former's phase compensation, improving the synchronous stability in the transient domain. The latter's phase compensation makes $D''$ of the second PSS 8 increase, improving the stability in the static domain.

Figure 6:
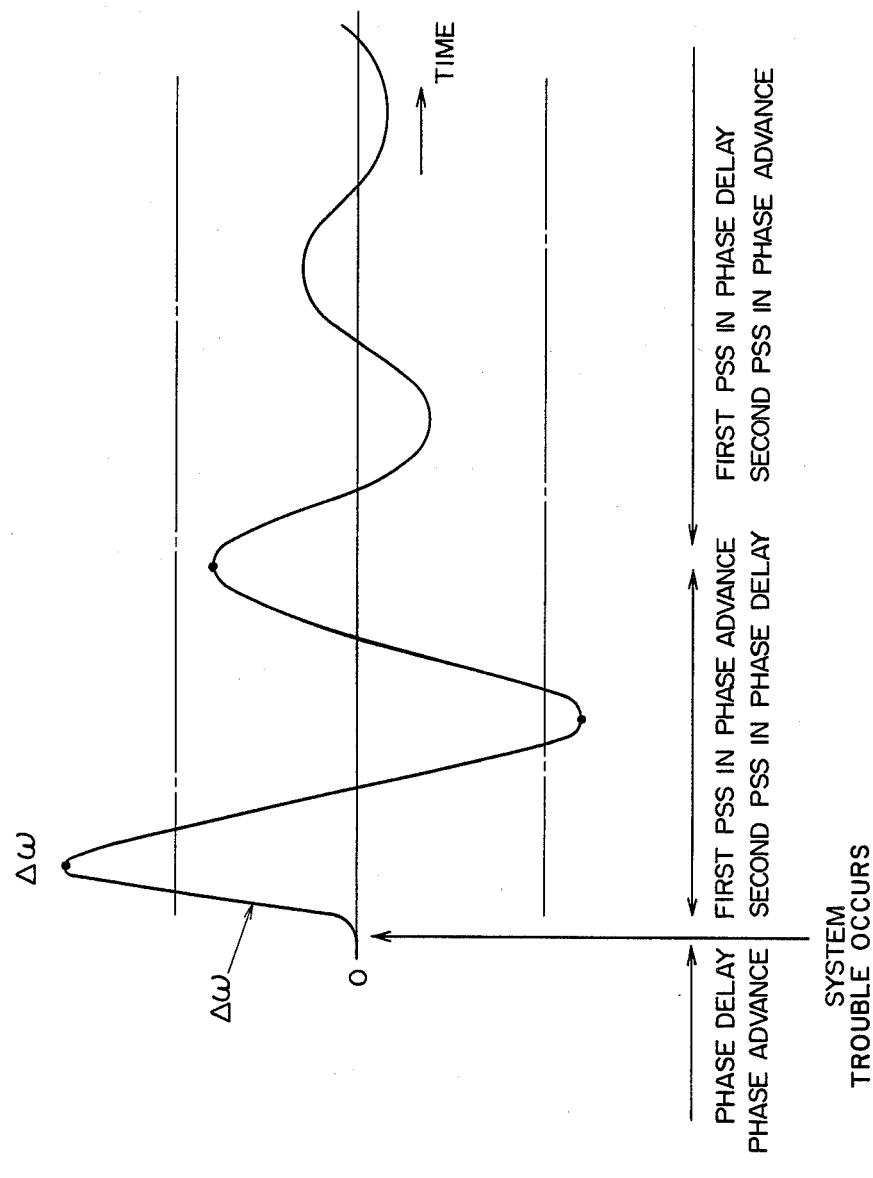
FIG. 6 shows drift motion of a generator.

FIG. 6 shows the relation between change of the revolution deviation $\Delta\omega$ and phase advance and delay control of both PSSs 2 and 8 in case of trouble in the system connected with the generator. The chain lines in FIG. 6 are showing the threshold values.

The apparatus of this invention with the construction as described above acts as follows; it is supposed that the revolution of deviation of the generator is input to the input terminal 10 of the drift amount judging circuit 9 and the input terminal 11 of the first PSS 8. When a trouble takes place in the power system, the revolution deviation $\Delta\omega$ of the generator varies as shown in FIG. 6. The revolution deviation $\Delta\omega$ of the generator takes the value of nearly zero in normal running conditions, where the phase compensation of the second PSS 2 is advanced to increase the braking power while the phase compensation of the first PSS 8 is delayed to increase the synchronizing power.

The $\Delta\omega$ change, as shown during FIG. 6, in system troubles is detected by the drift amount judging circuit 9 so that concurrently with the trouble occurrence, the phase compensation of the second PSS 2 is delayed while that of the first PSS 8 is advanced. This situation continues until the peak value of $\Delta\omega$ exceeds a predetermined level and then each phase compensation is returned to the original value respectively.

These outputs of the first PSS 2 and the second PSS 8 are added as the supplement signals of the exciting system to the adder circuit 5. This addition being a so called vector synthesis, the vector component of the first PSS 8 for increasing the synchronizing power becomes greater immediately after the trouble occurence, while the vector component of the second PSS 2 for increasing the braking power becomes greater during normal running conditions.

Though in the above embodiment the transient and static domains of the drift of the generator are judged with respect to the revolution deviation, the output deviation or the terminal voltage deviation of the generator is available for the judgement in the same way.

Furthermore, while the above embodiment utilizes the switchover in two steps of each phase compensation element according to the revolution deviation, finer switchover in n steps gives the same effect, as described above.

And still more, the number of revolution of the generator, the frequency of the terminal voltage, and the output of the generator itself can be input as the input signals to the first and second PSS 8 and 2, whereby the deviation signals are gained in each PSS 8 and 2.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bouds of the claims, or equivalence of such metes and bounds thereof are therefore intended to be embraced by the claims.

What is claimed is:

1. A power system stabilizing circuit for controlling a voltage regulator whose output voltage is applied to the field windings of a synchronous generator, comprising:
   a first power stabilizer including a phase compensation circuit having an adjustable phase delay, for receiving a signal relating to a first parameter indicative of the operation of said synchronous generator and producing an output signal that results in an increase in the synchronizing torque of the generator;
   a second power stabilizer including a phase compensation circuit having an adjustable phase delay, for receiving a signal relating to a second parameter indicative of the operation of said synchronous generator and producing an output signal that results in an increase in the braking torque of the generator;
   a system drift judging circuit for detecting drift in the operation of said generator and adjusting said phase delays in response to detected drift; and
   means for applying said output signals from said power stabilizers to said voltage regulator.

2. The power system stabilizing circuit of claim 1 wherein said first parameter is indicative of the rotation of said synchronous generator.

3. The power system stabilizing circuit of claim 1 wherein said first parameter is indicative of the output frequency of said synchronous generator.

4. The power system stabilizing circuit of claim 1 wherein said second parameter is indicative of the output voltage of said synchronous generator.

5. The power system stabilizing circuit of claim 1 wherein said system drift judging circuit determines whether one of said first and second parameters exceeds a threshold value, and functions to advance the phase delay of said first power stabilizer and retard the phase delay of said second power stabilizer when the parameter exceeds the threshold, and to retard the phase delay of said first power stabilizer and advance the phase delay of said second power stabilizer when the parameter is less than the threshold.

* * * * *